No. 874,618. PATENTED DEC. 24, 1907.
A. D. OSTER & L. MAIN.
METHOD OF MAKING SWIVEL JOINTS.
APPLICATION FILED MAR. 12, 1907.
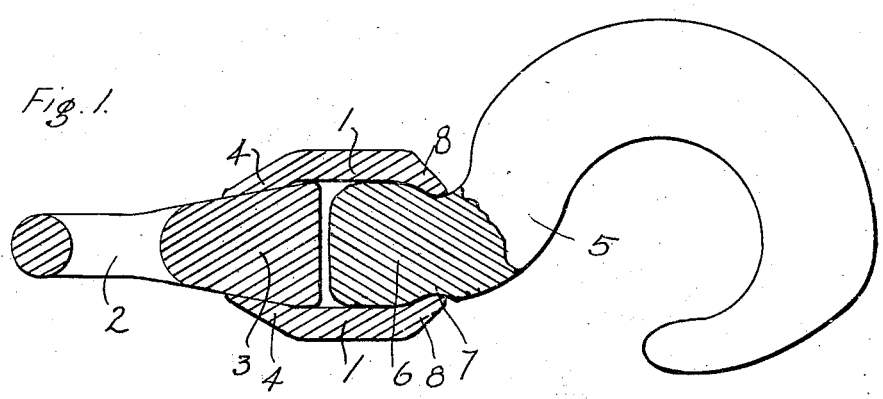
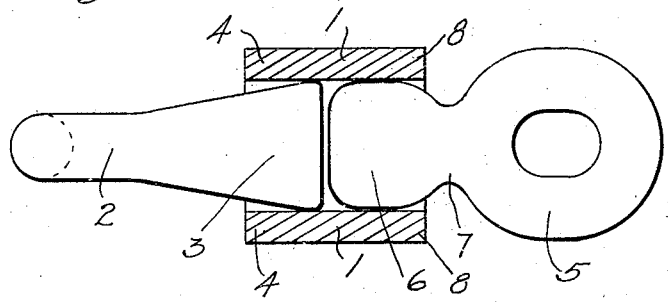
Witnesses
M. A. Van House
Arnott Woodroofe
Inventors
Arlie D. Oster
Lawrence Main
By T. J. Elliott
Attorney

UNITED STATES PATENT OFFICE.

ARLIE D. OSTER AND LAWRENCE MAIN, OF CENTRALIA, WASHINGTON.

METHOD OF MAKING SWIVEL-JOINTS.

No. 874,618.  Specification of Letters Patent.  Patented Dec. 24, 1907.

Application filed March 12, 1907. Serial No. 362,035.

*To all whom it may concern:*

Be it known that we, ARLIE D. OSTER and LAWRENCE MAIN, citizens of the United States of America, residing at Centralia, in the county of Lewis and State of Washington, have invented certain new and useful Improvements in Methods of Making Swivel-Joints, of which the following is a specification, reference being had therein to the accompanying drawing.

This invention relates to the method of making swivel-joints, especially to those used in cable and chain lines under tensile stress; and has for its objects to provide a swivel connection which will not become clamped under tension, and to so simplify the method of making as to reduce the time and cost of manufacture.

Our invention is illustrated in the accompanying drawing in which

Figure 1 is a section showing a completed swivel-connection between an eye and a hook, and Fig. 2 is a section of the binding ring, with two eye-pieces therein, before the ring has been forged to its finished shape.

Similar numerals of reference refer to similar parts throughout the several views.

Our invention consists in welding an eye-piece into a ring and then forging the ring around the enlarged end of another eye-piece, or hook, forming the swivel-part, and turning said swivel-part within the forged ring during the forging thereof. The swivel-connection thus made is found in practice to overcome the principal objection found in similar devices at the present time in that under tension it is practically as free to turn as when relieved from tension. This is probably due to the fact that we turn the swivel-part while the ring is still sufficiently hot to be soft, and also to the chilling effect of the cold iron of the swivel part in contact with the hot ring thus making, when the connection is completed, a smooth hard surface on the inner side of the ring against which the enlargement of the swivel-part bears.

The ring 1 is made of such size, in diameter and length, as to receive the enlarged ends of the two links and to be forged around them as hereinafter described. The fixed link 2 will usually be constructed as an eye-piece and has its inner end 3 enlarged with inclined sides and is either of circular or any other convenient cross-section. This link 2 is heated to a very high temperature at the same time that the ring is heated, and the end 4 of the ring is forged around it and welded to it so that the ring 1 and the link 2 become practically one body. The swivel-link 5 is formed with a ball-shaped, or other similarly shaped, enlargement 6 at its inner end, having a neck 7 between the outer part of the link and the inner enlargement 6. This link 5 is inserted into the hot ring 1 and the end 8 of the ring is forged around the outer part of the enlargement 6, to the neck 7, and at the same time the link 5 is turned relatively to the ring 1. The outer part of the link 5 may be formed as an eye-piece, a hook, or any other suitable device.

Having now described our invention what we claim is:

1. The method of making a swivel-connection consisting of welding a fixed link into the end of a ring, and forging the other end of the ring around the enlarged end of the swivel-link.

2. The method of making a swivel-connection consisting of welding a fixed link into the end of a ring, forging the other end of the ring around the enlarged end of the swivel-link, and turning the swivel-link relatively to the ring during the forging of the ring therearound.

In testimony whereof we affix our signatures in presence of two witnesses.

ARLIE D. OSTER.
LAWRENCE MAIN.

Witnesses:
F. W. THOMAS,
C. G. INGALLS.